United States Patent
Jiang

(10) Patent No.: US 6,349,007 B1
(45) Date of Patent: Feb. 19, 2002

(54) MAGNETO-RESISTIVE HEAD OPEN AND SHORT FAULT DETECTION INDEPENDENT OF HEAD BIAS FOR VOLTAGE BIAS PREAMPLIFIER

(75) Inventor: Hong Jiang, Milpitas, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/682,127

(22) Filed: Jul. 25, 2001

(51) Int. Cl.$^7$ ............................................... G11B 27/36
(52) U.S. Cl. ......................... 360/31; 360/46; 360/67; 360/313
(58) Field of Search ............................ 324/212, 226, 324/609, 610, 522, 523, 509, 500, 537, 546, 525, 526, 210; 340/635, 652, 653, 650; 369/53.42, 53.38, 53.1; 360/31, 46, 67, 313, 66

(56) References Cited

U.S. PATENT DOCUMENTS 4,203,137 A * 5/1980 Beck et al. .................... 360/31
5,087,884 A * 2/1992 Brannon ....................... 324/523
5,410,439 A * 4/1995 Egbert et al. ................... 360/75
5,457,391 A * 10/1995 Shimizu et al. ............. 324/546
6,104,199 A * 8/2000 Sako ........................... 324/546

* cited by examiner

*Primary Examiner*—Alan T. Faber
(74) *Attorney, Agent, or Firm*—W. Daniel Swayze, Jr.; W. James Brady; Frederick J. Telecky, Jr.

(57) ABSTRACT

A circuit (50,100,1 12,1 30) for detecting a fault in a magneto-resistive head (18) includes a transconductance amplifier (52) having an input across which the head (18) is connected. A circuit (130) for determining a ratio of a current in the head, $I_{VMR}$, to a variable control current, $I_1$, is applied to maintain a substantially constant voltage at an output of the transconductance amplifier (52). The current, $I_{VMR}$, in the head is a function of the variable control current, $I_1$, The circuit for determining a ratio of a current, $I_{VMR}$, flowing in the head (18) to the variable control current, $I_1$, comprises first (112) and (100) second current mirrors, the first current mirror (112) mirroring the current flowing in the head (18), and the second current mirror (101) mirroring the variable control current, $I_1$, Circuitry (132,135) is provided that triggers fault indicating output signals if the ratio falls outside a predetermined range.

17 Claims, 3 Drawing Sheets

MAGNETO-RESISTIVE HEAD OPEN AND SHORT FAULT DETECTION INDEPENDENT OF HEAD BIAS FOR VOLTAGE BIAS PREAMPLIFIER

BACKGROUND OF INVENTION

1. Field of Invention

This invention relates to improvements in methods and apparatuses for dynamic information storage or retrieval, and more particularly to improvements in methods and circuitry for detecting electrical resistance in electronic components, especially for detecting open and short faults in magneto-resistive read heads of mass data storage devices, hard disk drives, or the like.

2. Relevant Background

Mass data storage devices include tape drives, as well as hard disk drives that have one or more spinning magnetic disks or platters onto which data is recorded for storage and subsequent retrieval. Hard disk drives may be used in many applications, including personal computers, set top boxes, video and television applications, audio applications, or some mix thereof. Applications for hard disk drives are still being developed, and are expected to further increase in the future.

Typically, mass data storage devices include a data transducer, or head, that is used to read data from and write data to a rotating magnetic media, usually in the form of a disk or platter on which a material containing orientable magnetic domains is carried. The present invention pertains especially to magneto-resistive data transducers, or heads, which change in resistivity in the presence of magnetic fields adjacent the disk produced by selectively oriented magnetic domains in the magnetic material on the disk. The typical resistance of a magneto-resistive head is in the range of between about 16 and 150 ohms.

Sometimes, however, the head mechanism experiences faults, the faults of interest herein being open and short faults. Efforts have been made to detect such open and short faults; however, such efforts have required that the read head be biased by electrical current, not voltage, and that both the open and short detection thresholds for head resistance vary over bias level.

What is needed, therefore, is a relatively simple and reliable circuit and method for detecting open and short conditions in a circuit element, such as a magneto-resistive data transducer or head, in which the open and short fault conditions can be detected independently of the head bias for voltage preamplifiers. The simplicity of circuit implementation should result in little or no impact on the thermal noise, power supply noise rejection, read signal path bandwidth, head-to-head switching, or read head circuit performance.

SUMMARY OF INVENTION

In light of the above, therefore, it is an object of the invention to provide a circuit and method for detecting open and short fault conditions in a circuit element, such as a magneto-resistive data transducer, head, or the like.

One of the advantages of the circuit used in accordance with a preferred embodiment of the invention is that an open or short head condition can be established independently of the bias on the head.

These and other objects, features and advantages of the invention will be apparent to those skilled in the art from the following detailed description of the invention, when read in conjunction with the accompanying drawings and appended claims.

Thus, according to a broad aspect of the invention, a circuit is provided for detecting a fault in a magneto-resistive head. The circuit includes a transconductance amplifier having an input across which the head is connected. A circuit is provided for determining a ratio of a current in the head to a variable control current applied to maintain a substantially constant voltage at an output of the transconductance amplifier, the current in the head being a function of the variable control current. A trigger circuit triggers a fault indicating output signal if the ratio falls outside a predetermined range. The circuit for determining the ratio of a current flowing in the head to the variable control current may include first and second current mirrors. The first current mirror mirrors the current flowing in the head, and the second current mirror mirrors the variable control current. The circuit for triggering a fault indicating output signal if the ratio falls outside a predetermined range may include a circuit for triggering an open fault indicating output signal if the ratio exceeds a first predetermined ratio, and a circuit for triggering a short fault indicating output signal if the ratio falls below a second predetermined ratio.

According to another broad aspect of the invention, a second circuit embodiment is provided for detecting a fault in a magneto-resistive head. The second circuit embodiment includes a transconductance amplifier having an input across which the head is connected. Means are provided for determining a ratio of a current in the head to a variable control current applied to maintain a substantially constant voltage at an output of the transconductance amplifier, the current in the head being a function of the variable control current. Means are also provided for triggering a fault indicating output signal if the ratio falls outside a predetermined range. The means for determining a ratio of a current in the head to a variable control current may include means for mirroring the head current to provide a mirrored head current, means for mirroring the variable control current to provide a mirrored variable control current, and means for dividing the mirrored head current by the mirrored variable control current.

According to yet another broad aspect of the invention, a mass data storage device is provided. The mass data storage device includes a magneto-resistive head and a transconductance amplifier having a variable gain and having an input across which the head is connected. A capacitor is provided to receive an output current from the transconductance amplifier. A first variable current source produces a first variable current in the head, and a second variable current source causes a second variable current to flow through a reference current path. The first variable current is a function of the second variable current. A circuit produces a voltage to control the variable gain, based upon the second variable current, and a feedback path varies the second variable current to control the output current from the transconductance amplifier to maintain a substantially constant voltage on the capacitor. A circuit determines a ratio of the first and second currents, and a circuit triggers a fault indicating output signal if the ratio falls outside a predetermined range. The circuit for determining a ratio of the first and second currents may include first and second current mirrors, the first current mirror mirroring the first current, and the second current mirror mirroring the second current. The circuit for triggering a fault indicating output signal if the ratio falls outside a predetermined range may include a circuit to produce an open fault indicating output signal if the ratio exceeds a first predetermined ratio and a circuit for triggering a short fault indicating output signal if the ratio falls below a second predetermined ratio.

According to still another broad aspect of the invention, a method is provided for detecting a fault in a magneto-resistive head for detecting magnetic fields in a data storage device. The method includes determining a ratio of a head current to a variable control current that maintains a constant control voltage in a servo loop that includes the head. The head current is a function of the variable control current. A fault indicating output signal is triggered if the ratio falls outside a predetermined range. Triggering a fault indicating output signal if the ratio falls outside a predetermined range may include triggering an open fault indicating signal if the ratio exceeds a first predetermined ratio and triggering a short fault indicating signal if the ratio falls below a second predetermined ratio. Determining a ratio of a head current to a variable control current may include mirroring the head current to provide a mirrored head current, mirroring the variable control current to provide a mirrored variable control current, and dividing the mirrored head current by the mirrored variable control current.

BRIEF DESCRIPTION OF DRAWINGS

The invention is illustrated in the accompanying drawings, in which.

In the various figures of the drawing, like reference numerals are used to denote like or similar parts.

DETAILED DESCRIPTION

Figure 1:
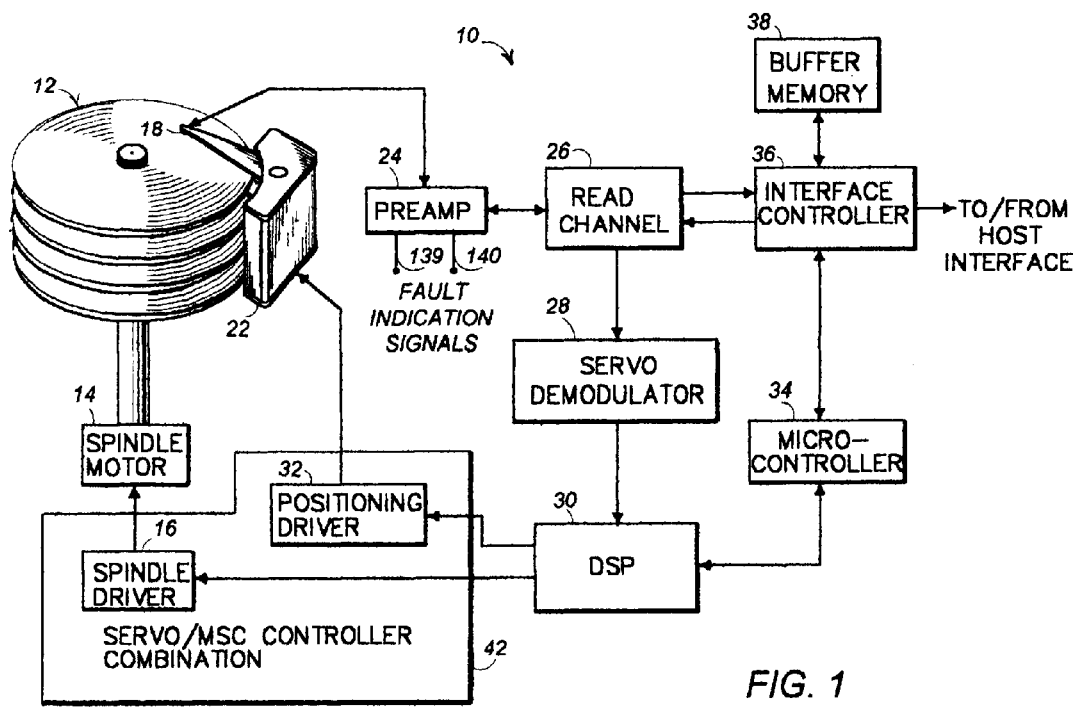
FIG. 1 is a block diagram of a generic disk drive system, illustrating the general environment in which the invention may be practiced.

The invention is illustrated in the accompanying drawings to which reference is now made. FIG. 1 is a block diagram of a generic disk drive system 10, which represents one general environment in which the invention may be practiced. The system 10 includes a magnetic media disk 12 that is rotated by a spindle motor 14 and spindle driver circuit 16.

A data read/write transducer or head 18 is locatable along selectable radial tracks (not shown) of the disk 12 by a voice coil motor 22. Preferably the data read/write transducer or head 18 is a magneto-resistive (MR) head, which changes in resistivity in the presence of a magnetic field.

The radial tracks may contain magnetic states that contain information about the tracks, such as track identification data, location information, synchronization data, as well as user data, and so forth. The head 18 may be used both to read user data back from the disk 12, as well as to detect signals that identify the tracks and sectors at which data is written, and to detect servo bursts that enable the head 18 to be properly laterally aligned with the tracks of the disk 12.

Analog electrical signals that are generated by the head 18 in response to the magnetic signals recorded on the disk 12 are preamplified by a preamplifier 24 for delivery to read channel circuitry 26. Servo signals, below described in detail, are detected and demodulated by one or more servo demodulator circuits 28 and processed by a digital signal processor (DSP) 30 to control the position of the head 18 via the positioning driver circuit 32. The servo data that is read and processed may be analog data that is interpreted by the DSP 30 for positioning the head 18.

A microcontroller 34 is typically provided to control the DSP 30, as well as an interface controller 36 to enable data to be passed to and from a host interface (not shown) in known manner. A data memory 38 may be provided, if desired, to buffer data being written to and read from the disk 12. Typically an "H" bridge writer is used to drive the signals from the interface controller 36, read channel 26 and preamplifier 24 to be written to the head 18.

According to a preferred embodiment of the invention, open and short faults of the write head 18 can be reliably detected to alert an operator or machine that a malfunction is occurring in the head. The term "open" is used herein to indicate a fault condition in which the resistance of the MR head in question exceeds a predetermined resistance. It does not necessarily require that the resistance be at or substantially at infinity. Likewise, the term "short" is used herein to indicate a fault condition in which the resistance of the MR head in question falls below a predetermined resistance. It does not necessarily require that the resistance be at or substantially at zero voltage bias.

Figure 2:
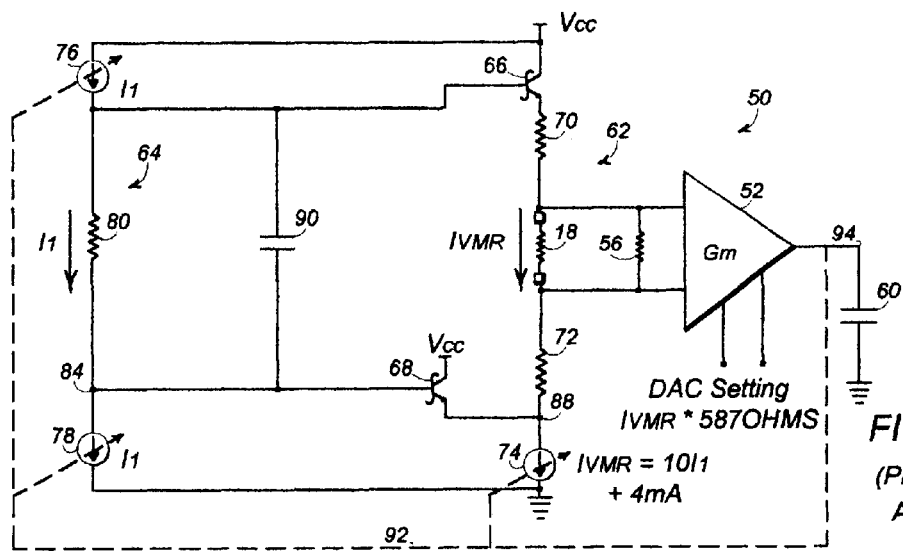
FIG. 2 is an electrical schematic diagram of a typical transconductance amplifier circuit for providing head bias voltage for use with an MR head transducer of a mass data storage device, in accordance with the prior art with which the circuitry and method of the invention may be employed.

An MR head driving circuit 50, is shown in FIG. 2, to which reference is now additionally made. The head voltage bias circuit 50 is a typical circuit for providing head voltage bias, which has been previously used, and provides one environment in which the circuit and method of the invention may be employed. The circuit 50 uses currents that are generated by mirror circuits 100 and 112, shown in FIG. 3 for use in controlling open and short detectors, shown in FIG. 4, below described. The circuit 50 includes a transconductance amplifier 52 that has one set of inputs across which the MR head 18 is connected. The transconductance amplifier 52 may be a full differential amplifier, with the voltage across the MR head 18 providing one voltage input, and a reference voltage providing another voltage input. The reference voltage input may be established by a DAC, below discussed in conjunction with FIG. 3, and may conveniently be set at a value of $I_{VMR}*587$ Ohms. A resistance-matching resistor 56 may be provided in parallel with the MR head 18, as shown.

A capacitor 60 is connected between the output of the transconductance amplifier 52 and ground from which current can be supplied or sunk in the operation of the circuit 50. The circuit 50 operates essentially as a servo loop to maintain a fixed predetermined as voltage on the MR head 18, in a manner below described in detail.

The circuit 50 includes two current paths 62 and 64. The current the path 64 provides a reference voltage to the transistors 66 and 68 to control the current in the current path 62. More particularly, the first current path 62 includes an npn transistor 66 in series with a resistor 70 on the top side of the MR head 18, connecting the MR head 64 to $V_{cc}$. Similarly, the bottom side of the MR head 18 is connected by a resistor 72 and current source 74 to ground. The second current path 64 includes two current sources 76 and 78 connected in series with a resistor 80 between $V_{cc}$ and ground. The node 84 is connected to the base of the second npn transistor 68, with its emitter connected to a node 88 between the resistor 72 and current source 74. A capacitor 90 is connected between the respective bases of transistors 66 and 86, as shown.

The current sources 74, 76, and 78 are adjustable by the current supplied by the output of the transconductance amplifier 52, as denoted by the dashed line 92, to maintain the voltage on output node 94 at an essentially constant value. As the voltage on node 94 rises, current from the transconductance amplifier 52 tends to charge the capacitor 60. This has the effect of reducing the current $I_{VMR}$ flowing through the MR head 18, which, in turn, reduces the output current to the capacitor 60 from the transconductance amplifier 52. This, reduce the voltage on node 94 to the constant voltage. On the other hand, if the voltage on output node 94 begins to fall, current is sunk from the capacitor 60. This has the effect of increasing the current $I_{VMR}$ flowing through the MR head 18, which, in turn, increases the output current from the transconductance amplifier 52 to the capacitor 60, returning the output node 94 to its normal fixed voltage.

According to a preferred embodiment of the invention, a control current, $I_1$, is established by the current sources 76 and 78, and the current $I_{VMR}$ is established by the current source 74, which, in the embodiment shown, is set at $10I_1+4$ mA. This is mirrored to the open and short detection circuit 130, described below with reference to FIG. 4, by a current mirror circuit, which is shown in FIG. 3, to which reference is now made.

Figure 3:
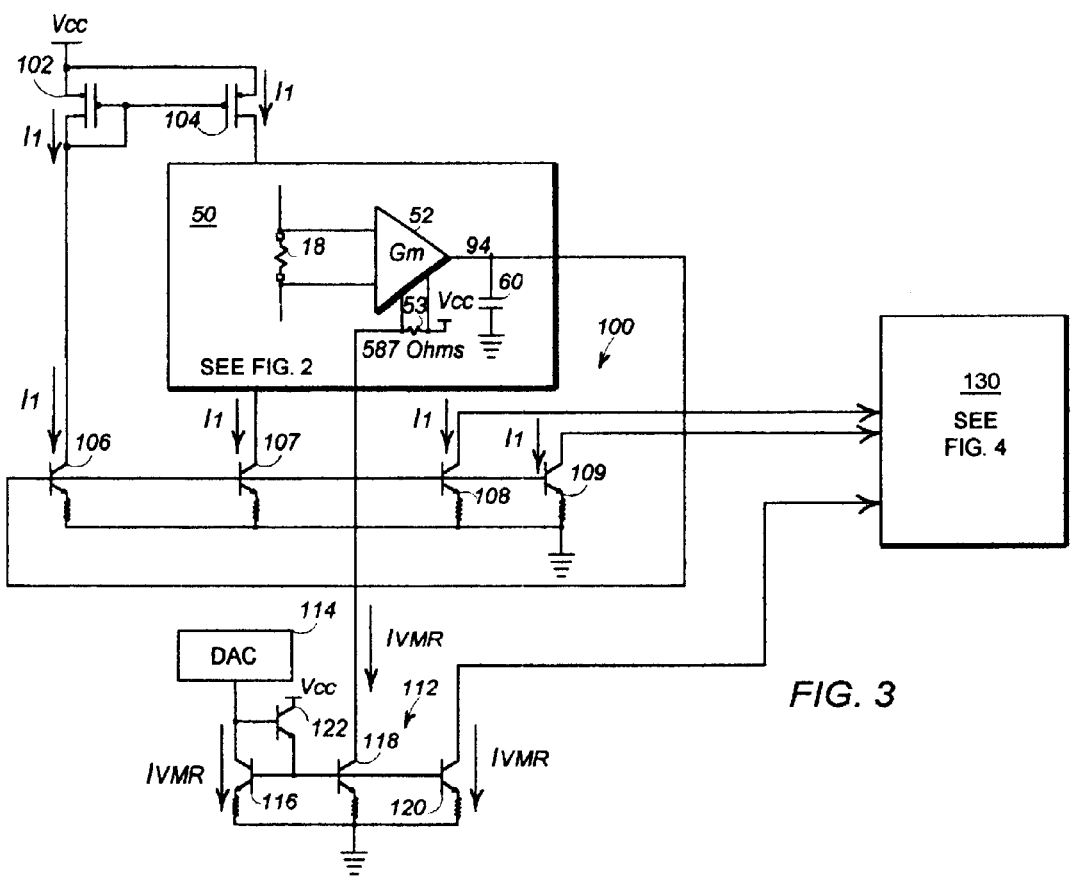
FIG. 3 is an electrical schematic diagram of a current mirror circuit for mirroring the currents in the circuit of FIG. 2 to the open and short fault detector circuit of FIG. 4, in accordance with a preferred embodiment of the invention.
Figure 4:
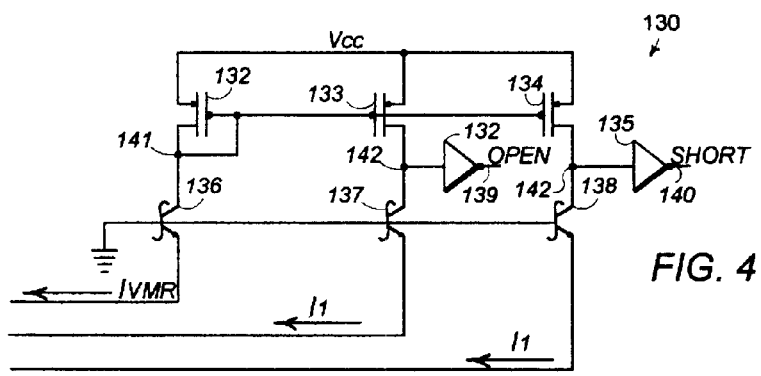
FIG. 4 is an electrical schematic diagram of an open and short fault detector circuit for use in conjunction with the current mirror circuit of FIG. 3 and the transconductance amplifier circuit of FIG. 2, in accordance with a preferred embodiment of the invention.

As shown in FIG. 3, a mirror circuit 100 is used to mirror the currents of FIG. 2 to the open and short detecting circuit of FIG. 4. The current, $I_1$, is provided to the circuit 50 by a pair of PMOS transistors 102 and 104 that are connected in a current mirror fashion, as shown. Thus, the current supplied to the circuit 50 is the control current $I_1$, described above. The current $I_1$ is mirrored in npn mirror transistors 106–109 to the circuit of FIG. 4. Similarly, the current, $I_{VMR}$, is developed in a mirror circuit 112. The current, $I_{VMR}$, is pulled through a resistor 53 that is connected across the reference terminals of the transconductor amplifier 52 to provide a voltage thereto to adjust the gain of the transconductor amplifier 52. The resistor 53, in the embodiment shown, is of value of 587 ohms. This provides the voltage across the input terminals of $I_{VMR}$ times 587 ohms, as indicated above with reference to the description of circuit 50 in FIG. 2. It should be noted that the transconductance amplifier 52 is a full differential amplifier, having two inputs, one provided by the MR head 18, the other provided by the by the second set of input terminals, in the case illustrated, receiving the voltage developed across the 587 ohm resistor. The output of the transconductance amplifier 52 is connected to the respective bases of npn transistors 106–109 to control the current $I_1$ flowing therethrough.

With reference again to the development of the current $I_{VMR}$, a DAC 114 develops a reference current $I_{VMR}$ in conjunction with the npn transistor 116. The voltage on the base of transistor 11 6 is applied to the bases of npn transistors 118 and 120. An npn transistor 122 is connected between the base and collector of transistor 116 to control the voltage on the bases of transistors 116, 118, and 120. Thus, the reference current, $I_{VMR}$, established through the 587 ohm resistor 53 in the circuit 50, as well as in the open and short detection circuit 130 described below in FIG. 4.

As shown in FIG. 4, to which reference is now additionally made, three current paths are provided through at least portions of which the respective currents $I_{VMR}$, $I_1$, and $I_1$ are established. PMOS load transistors 132–134 are provided to establish respective current paths to $V_{CC}$ for npn transistors 136–138. The gates of PMOS transistors 132–134 are connected to the drain of PMOS transistor 132 to establish the voltage on node 141 in the current path of $I_{VMR}$ on the gates of PMOS transistors 133 and 134. The bases of npn transistors 136–138 are connected to ground, or a common reference potential.

A pair of inverters 132 and 135 have their inputs connected respectively to the junction 142 between the drain and collector of transistors 133 and 137, and the junction 143 between the drain and collector of transistors 134 and 138. The inverters 132 and 135 respectively detect open and short conditions of the MR head to produce fault indication output signals on respective lines 139 and 140. More particularly, the voltages developed on nodes 142 and 143 represent a quotient of $I_1$ and $I_{VMR}$. The thresholds voltage values that are established as described below are applied to the inverters 132 and 135 to detect the ratio of $I_{VMR}$ to $I_1$, in accordance with the curves shown in FIGS. 5 and 6, described below.

The PMOS transistors 132–134 are sized to establish the desired open fault and short fault thresholds to be detected by the inverters 132 and 135, as follows. The current mirror formed by the PMOS transistors 132 and 133 establishes a current through PMOS transistor 133 in proportion to the relative sizes of the PMOS transistors 132 and 133 with respect to the current $I_{VMR}$ flowing in transistor 132. For example, if transistor 133 is 0.475 times smaller than PMOS transistor 132, the current flowing to node 142 will be $0.475 \times I_{VMR}$. However, npn transistor 137 is connected to the current mirror established by npn transistor 108 in FIG. 3. As a result, a current value of $I_1$ is established through npn transistor 137. Consequently, charge will build up on node 142 if the value of $I_1$ is less than $0.475 \times I_{VMR}$, raising the potential thereon to trigger the inverter 132 to generate a low state on output line 139. On the other hand, if the value of $I_1$ is greater than $0.475 \times I_{VMR}$, the potential on node 142 will be less than the threshold of the inverter 132, so a high output state will be generated on output line 139. It should be noted that the ratio value of 0.475 selected for this example is arbitrary, and can be chosen as desired to set the trigger threshold to any wanted value.

Moreover, the current mirror formed by the PMOS transistors 132 and 134 establishes a current through PMOS transistor 134 in proportion to the relative sizes of the PMOS transistors 132 and 134 with respect to the current $I_{VMR}$ flowing in transistor 132. For example, if transistor 134 is 4 times larger than PMOS transistor 132, the current flowing to node 143 will be $4 \times I_{VMR}$. However, npn transistor 138 is connected to the current mirror established by npn transistor 109 in FIG. 3. As a result, a current value of $I_1$ is established through npn transistor 139. Consequently, charge will build up on node 143 if the value of $I_1$ is less than $4 \times I_{VMR}$, raising the potential thereon to trigger the inverter 135 to generate a low state on output line 140. On the other hand, if the value of $I_1$ is greater than $4 \times I_{VMR}$, the potential on node 143 will be less than the threshold of the inverter 135, so a high output state will be generated on output line 140. It should again be noted that the ratio value of 4 selected for this example is arbitrary, and can be chosen as desired to set the trigger threshold to any wanted value.

Figure 5:
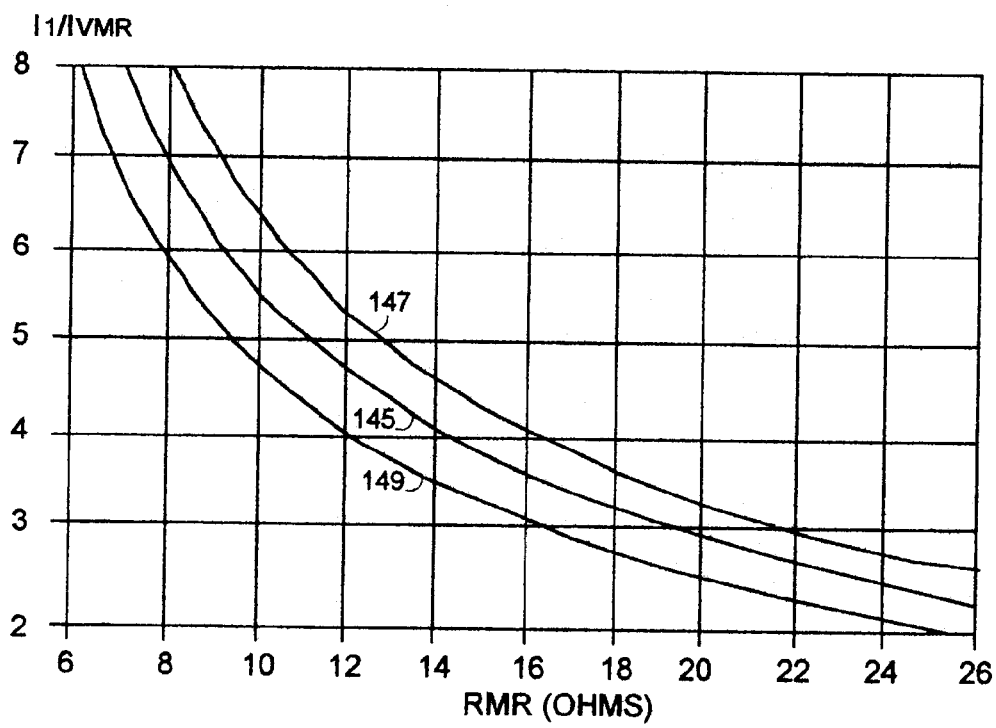
FIG. 5 is a series of curves used in analyzing a short fault detection mode of operation of the circuit of FIGS. 2–4, in accordance with a preferred embodiment of the invention.

Curves indicating the relationship between the resistance of the MR head (RMR) in ohms verses the ratio of $I_1$ to $I_{VMR}$ for a short fault head detection are shown in FIG. 5, to which reference is now additionally made. It can be seen from the curve 145, for example, that if the resistance in ohms of the head is approximately 14, the ratio of $I_1$ to $I_{VMR}$ is about four. The range of values can be established to compensate for process and other variations so that, for example, if the resistance of the MR head is 14 ohms, the ratios of $I_1$ to $I_{VMR}$, may vary from about 4.6 to 3.5, indicated by curves 147 and 149. Thus, the threshold of the inverter 135 can be set to trigger at a current ratio of about 4 if the trigger point is desired to be set when the resistance of the head falls below a predetermined value, such as 14 ohms, as shown.

Figure 6:
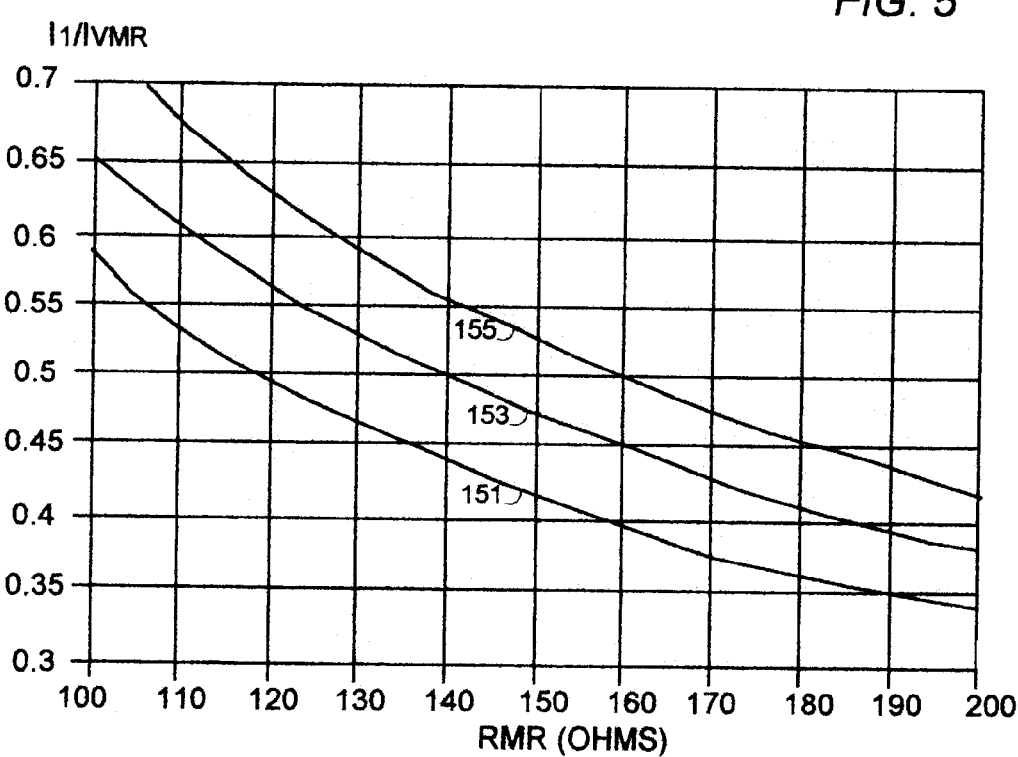
FIG. 6 is a series of curves used in analyzing an open fault detection mode of operation of the circuit of FIGS. 2–4, in accordance with a preferred embodiment of the invention.

Similarly, the corresponding curves for an open circuit case are shown in FIG. 6, to which reference is now additionally made. In FIG. 6, for example, for an MR head resistance of 150 ohms, the current ratio of $I_1$ to $I_{VMR}$ is approximately 0.475, as shown by the curve 153. To compensate for process variations, the open fault threshold of inverter 132 can be set to be between about 0.420 and 0.525, as shown respectively by curves 151 and 155.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A circuit for detecting a fault in a magneto-resistive head, comprising:
    a transconductance amplifier having an input across which said head is connected;
    a circuit for determining a ratio of a current in said head with respect to a variable control current applied to maintain a substantially constant voltage at an output of said transconductance amplifier, said current in said head being a function of said variable control current;
    and a circuit for triggering a fault indicating output signal if said ratio falls outside a predetermined range.

2. The circuit of claim 1 wherein said circuit for determining a ratio of a current flowing in said head with respect to said variable control current comprises first and second current mirrors, said first current mirror mirroring said current flowing in said head, and said second current mirror mirroring said variable control current.

3. The circuit of claim 1 wherein said circuit for triggering a fault indicating output signal if said ratio falls outside a predetermined range comprises:
    a circuit for triggering an open fault indicating output signal if said ratio exceeds a first predetermined ratio;
    and a circuit for triggering a short fault indicating output signal if said ratio falls below a second predetermined ratio.

4. The circuit of claim 3 wherein said circuit for determining a ratio of a current flowing in said head with respect to said variable control current comprises first, second, and third current mirrors, said first current mirror mirroring said current flowing in said head, and said second and third current mirrors mirroring said variable control current.

5. The circuit of claim 4 wherein said circuit for triggering an open signal output if said ratio exceeds a first predetermined ratio comprises:
    first and second transistors through which said current flowing in said head flows;
    and third and forth transistors through which said variable control current flows;
    said third transistor being connected to mirror current in said first transistor and being sized with respect to said first transistor whereby a current through said third transistor represents said first predetermined ratio of current flowing in said head with respect to said variable control current;
    said second and forth transistor having a common control voltage;
    and a first amplifier connected between said third and forth transistors having a first threshold to trigger when said first voltage exceeds said first predetermined ratio.

6. The circuit of claim 5 wherein said circuit for triggering a short signal output if said ratio falls below a second predetermined ratio comprises:
    fifth and sixth transistors through which said variable control current flows;
    said fifth transistor being connected to mirror current in said first transistor and being sized with respect to said first transistor whereby a current through said fifth transistor represents said second predetermined ratio of current flowing in said head with respect to said variable control current;
    said second and sixth transistor having a common control voltage;
    and a second amplifier connected between said fifth and sixth transistors, having a second threshold to trigger when said first voltage ratio falls below said second predetermined ratio.

7. A circuit for detecting a fault in a magneto-resistive head, comprising:
    a transconductance amplifier having an input across which said head is connected;
    means for determining a ratio of a current in said head with respect to a variable control current applied to maintain a substantially constant voltage at an output of said transconductance amplifier, said current in said head being a function of said variable control current;
    and means for triggering a fault indicating output signal if said ratio falls outside a predetermined range.

8. The circuit of claim 7 wherein said means for determining a ratio of a current in said head to a variable control current comprises:
    means for mirroring said head current to provide a mirrored head current;
    means for mirroring said variable control current to provide a mirrored variable control current;
    and means for determining a ratio of said mirrored variable control current with respect to said mirrored head current.

9. A mass data storage device, comprising:
    a magneto-resistive head;
    a transconductance amplifier having a variable gain and having an input across which said head is connected;
    a capacitor for receiving an output current from said transconductance amplifier;
    a first variable current source for producing a first variable current in said head;
    a second variable current source for causing a second variable current to flow through a reference current path, said first variable current being a function of said second variable current;
    a circuit for producing a voltage to control said variable gain, based upon said second variable current;
    a feedback path to vary said second variable current to control said output current from said transconductance amplifier to maintain a substantially constant voltage on said capacitor;

a circuit for determining a ratio of said first and second currents;

and a circuit for triggering a fault indicating output signal if said ratio falls outside a predetermined range.

10. The mass data storage device of claim 9 wherein said circuit for determining a ratio of said first and second currents comprises first and second current mirrors, said first current mirror mirroring said first current, and said second current mirror mirroring said second current.

11. The mass data storage device of claim 9 wherein said circuit for triggering a fault indicating output signal if said ratio falls outside a predetermined range comprises:

a circuit to produce an open fault indicating output signal if said ratio exceeds a first predetermined ratio;

and a circuit for triggering a short fault indicating output signal if said ratio falls below a second predetermined ratio.

12. The mass data storage device of claim 11 wherein said circuit for determining a ratio of said currents comprises first, second, and third current mirrors, said first current mirror mirroring said first current, and said second and third current mirrors mirroring said second current.

13. The mass data storage device of claim 12 wherein said circuit for triggering a first signal output if said ratio exceeds a first predetermined ratio to indicate an open fault comprises:

first and second transistors through which said current flowing in said head flows;

and third and forth transistors through which said substantially constant reference current flows;

said third transistor being connected to mirror current in said first transistor and being sized with respect to said first transistor a current through said third transistor represents said first predetermined ratio of current flowing in said head with respect to said variable control current;

said third transistor being connected to mirror current in said first transistor;

and a first amplifier connected between said third and forth transistors, having a first threshold to trigger when said first voltage ratio exceeds said first predetermined ratio.

14. The mass data storage device of claim 13 wherein said circuit for triggering a second signal output if said ratio falls below a second predetermined ratio to indicate a short fault comprises:

fifth and sixth transistors through which said substantially constant reference current flows;

said fifth transistor being connected to mirror current in said first transistor and being sized with respect to said first transistor whereby a current through said fifth transistor represents said second predetermined ratio of current flowing in said head with respect to said variable control current;

said fifth transistor being connected to mirror current in said first transistor;

and a second amplifier connected between said fifth and sixth transistors, having a second threshold to trigger when said first voltage ratio falls below said second predetermined ratio.

15. A method for detecting a fault in a magneto-resistive head for detecting magnetic fields in a data storage device, comprising:

determining a ratio of a head current with respect to a variable control current that maintains a constant control voltage in a servo loop that includes said head, wherein said head current is a function of said variable control current;

and triggering a fault indicating output signal if said ratio falls outside a predetermined range.

16. The method of claim 15 wherein said triggering a fault indicating output signal if said ratio falls outside a predetermined range comprises:

triggering an open fault indicating signal if said ratio exceeds a first predetermined ratio;

and triggering a short fault indicating signal if said ratio falls below a second predetermined ratio.

17. The method of claim 16 wherein said determining a ratio of a head current to a variable control current comprises:

mirroring said head current to provide a mirrored head current;

mirroring said variable control current to provide a mirrored variable control current;

and determining a ratio of said mirrored variable control current with respect to said mirrored head current.

* * * * *